G. HAWLEY.
RAKE.
No. 175,350. Patented March 28, 1876.
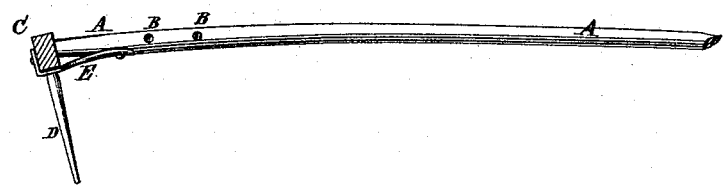
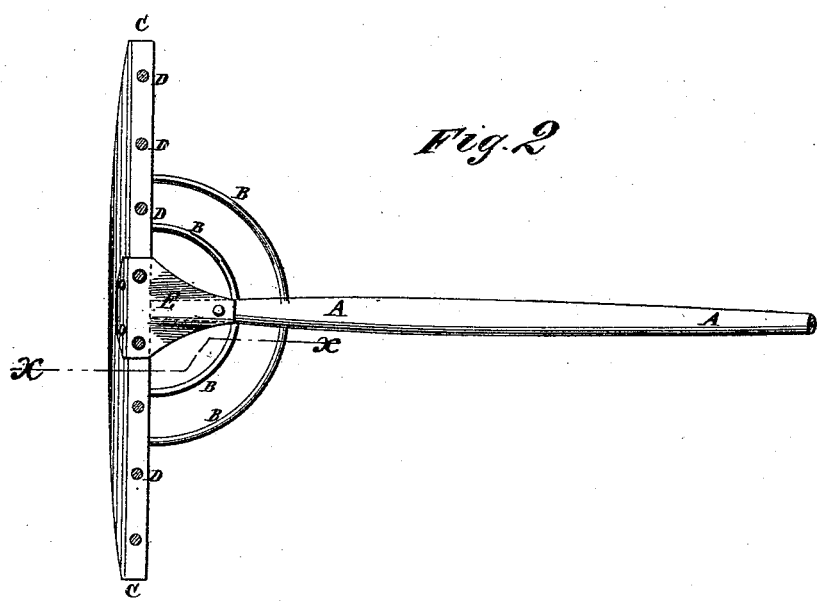
WITNESSES:
A. W. Almqvist
Alex F. Roberts
INVENTOR:
G. Hawley
BY
ATTORNEYS.

United States Patent Office.

GLOVER HAWLEY, OF HAWLEYVILLE, CONNECTICUT.

IMPROVEMENT IN RAKES.

Specification forming part of Letters Patent No. 175,350, dated March 28, 1876; application filed February 21, 1876.

*To all whom it may concern:*

Be it known that I, GLOVER HAWLEY, of Hawleyville, Fairfield county, Connecticut, have invented a new and useful Improvement in Rakes, of which the following is a specification:

Figure 1 is a side view of a rake to which my improvement has been applied, partly in section, through line $x\ x$, Fig. 2; and Fig. 2 is a face view of the rake, the teeth being shown in section.

Similar letters of reference indicate corresponding parts.

The object of this invention is to improve the construction of new rakes in such a manner as to make them stronger and more durable, and to make rakes that have become loose upon the handle as firm and strong as new ones.

The invention consists in a plate of wood, metal, or other suitable material, made wider at its forward end, and with two holes to receive the middle teeth, and secured to the handle and head, as hereinafter fully described.

A is the handle, B are the bows, C is the head, and D are the teeth, of a rake, about the construction of which there is nothing new. E is a plate, which may be made of wood, metal, or other suitable material. The inner or rear end of the plate E is made narrow, and is secured to the handle A by a screw, nail, or rivet. The forward end of the plate E is made wide enough to receive the two middle teeth D, and has two holes formed through it for the passage of the said teeth. The forward end of the plate E is secured to the rake-head C by screws, nails, or rivets, and, when made of sheet metal, may be bent to overlap the side of said rake-head, as shown in Figs. 1 and 2.

The plate E may be applied to a new rake, or to an old one, and stiffens and strengthens the rake, so as to make it much stronger and much more durable than rakes without said plate.

Having thus described my invention, I claim as new and desire to secure by Letters Patent—

The combination, with handle A and rake-head C, of the brace E, widening from rear to front, and receiving the two teeth D D, as and for the purpose specified.

GLOVER HAWLEY.

Witnesses:
 JAMES T. GRAHAM,
 T. B. MOSHER.